(12) United States Patent
Ogimura

(10) Patent No.: US 7,753,335 B2
(45) Date of Patent: Jul. 13, 2010

(54) EXHAUST PIPE STRUCTURE

(75) Inventor: Shoji Ogimura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 379 days.

(21) Appl. No.: 11/793,608

(22) PCT Filed: Dec. 23, 2005

(86) PCT No.: PCT/IB2005/003877

§ 371 (c)(1),
(2), (4) Date: Jun. 20, 2007

(87) PCT Pub. No.: WO2006/070255

PCT Pub. Date: Jul. 6, 2006

(65) Prior Publication Data

US 2008/0083866 A1   Apr. 10, 2008

(30) Foreign Application Priority Data

Dec. 28, 2004   (JP) .............................. 2004-379067

(51) Int. Cl.
*F16M 13/00* (2006.01)
(52) U.S. Cl. ........................................ 248/610; 248/58
(58) Field of Classification Search ................ 248/610, 248/58; 138/107
See application file for complete search history.

(56) References Cited

U.S. PATENT DOCUMENTS

| | | | | |
|---|---|---|---|---|
| 2,744,706 A | * | 5/1956 | Gerdy | ............................ 248/60 |
| 4,465,252 A | * | 8/1984 | Donovan et al. | ............... 248/60 |
| 6,572,070 B2 | * | 6/2003 | Arciero et al. | ............... 248/610 |
| 6,758,300 B2 | * | 7/2004 | Kromis et al. | ............... 180/309 |
| 2003/0057348 A1 | * | 3/2003 | Arciero et al. | ............... 248/610 |
| 2005/0184201 A1 | * | 8/2005 | Komitsu et al. | ................ 248/58 |

FOREIGN PATENT DOCUMENTS

| | | |
|---|---|---|
| EP | 0 908 345 A2 | 4/1999 |
| JP | 54-053218 U | 4/1979 |
| JP | 55-071919 U | 5/1980 |
| JP | 62-079917 U | 5/1987 |
| JP | 01-095431 U | 6/1989 |
| JP | 03-013525 U | 3/1991 |
| JP | 06-016810 U | 5/1994 |
| JP | 11-082624 A | 3/1999 |
| JP | 2000-120785 A | 4/2000 |
| JP | 2003-301884 A | 10/2003 |

* cited by examiner

Primary Examiner—Korie Chan
(74) Attorney, Agent, or Firm—Kenyon & Kenyon LLP

(57) ABSTRACT

In an exhaust pipe structure, there are provided a first supporting member that is attached to an exhaust pipe or a component attached to the exhaust pipe; a second supporting member that is attached to a vehicle body or a component fixed to the vehicle body; a supporting rubber member that connects the first supporting member to the second supporting member; and a reaching-prevention member that contacts the supporting rubber member just before the supporting rubber member reaches the supporting rubber member sticking position.

10 Claims, 2 Drawing Sheets

EXHAUST PIPE STRUCTURE

This is a 371 national phase application of PCT/IB2005/003877 filed 23 Dec. 2005, claiming priority to Japanese Patent Application No. 2004-379067 filed 28 Dec. 2004, the contents of which are incorporated herein by reference.

BACKGROUND OF THE INVENTION

1. Field of the Invention

The invention relates generally to an exhaust pipe structure, and, more specifically, to the structure of a portion that supports an exhaust pipe.

2. Description of the Related Art

Japanese Patent Application Publication No. 11-82624 A discloses an exhaust pipe structure. In the disclosed exhaust pipe structure, stoppers that restrict the movement of an exhaust pipe supporting rubber member are provided on the right side and left sides of the supporting rubber member. This structure prevents excessive rolling of the exhaust pipe.

However, because the movement of the supporting rubber member is restricted, the exhaust pipe structure disclosed in Japanese Patent Application Publication No. 11-82624 A has the following problems:
(a) The supporting rubber member frequently contacts the stopper. Accordingly, the supporting rubber member having sufficiently high strength needs to be prepared.
(b) Noise and vibration, which are caused due to contact between the supporting rubber member and the stopper, are transmitted into a vehicle compartment, resulting in higher levels noise and vibration in the vehicle compartment.

Further, document JP 2000-120785 discloses an exhaust pipe support structure that is suitable to reduce manufacturing costs of an exhaust pipe support structure and that is able to regulate lateral oscillation of the exhaust pipe. Therefore, a front of a support member extending from a vehicular body is bent to substantially be U-shaped in order to prepare a base portion and a front bent portion. A support device main body is prepared by elastically forming of an elastic rubber body, a first attaching part having a first attaching hole, a second attaching part having a second attaching hole inserted with a support member from an exhaust pipe, and a pair of main springs for connecting the first and second attaching parts to each other. The base portion is inserted into the first attaching hole, and the front bent portion is inserted into a space formed between the first and second attaching parts.

However, the exhaust pipe support structure of document JP 2000-120785 has the problem that the rubber member has to be provided with a sufficiently high strength and that noise and vibrations are caused due to frequent contact between the supporting member and the main springs which do only allow movement of the support device main body in relatively narrow angles.

SUMMARY OF THE INVENTION

It is an object of the invention to provide an exhaust pipe structure which prevents a supporting rubber member from reaching the rubber member sticking position, without affecting the structure in which the supporting rubber member moves and without inhibiting movement of the supporting rubber member.

In an exhaust pipe structure according to an aspect of the invention, there are provided a first supporting member that is attached to an exhaust pipe or a component attached to the exhaust pipe; a second supporting member that is attached to a vehicle body or a component fixed to the vehicle body; a supporting rubber member that connects the first supporting member to the second supporting member; and a reaching-prevention member that contacts the supporting rubber member just before the supporting rubber member reaches the supporting rubber member sticking position.

In the exhaust pipe structure according to the aspect, the reaching-prevention member contacts the supporting rubber member just before the supporting rubber member reaches the supporting rubber member sticking position. Accordingly, with this structure, the following effects can be obtained:
(a) The reaching-prevention member keeps the supporting rubber member from remaining in the supporting rubber member sticking position or keeps the supporting rubber member out of the supporting rubber member sticking position.
(b) Movement of the supporting rubber member is not inhibited by the reaching-prevention member, until the supporting rubber member reaches or comes close to the supporting rubber member sticking position and contacts the reaching-prevention member. Accordingly, the reaching-prevention member does not serve as a "stopper", as used in the manner described in the related art. As a result, the supporting rubber member contacts the reaching-prevention member less frequently.
(c) Because movement of the supporting rubber member is not inhibited by the reaching-prevention member until the supporting rubber member reaches or comes close to the supporting rubber member sticking position and contacts the reaching-prevention member, movement of the exhaust system component is less restricted than in the related art. This reduces the amount of noise and vibration that is transmitted to the vehicle compartment.

The reaching-prevention member may be configured to compress the supporting rubber member, when the supporting rubber member reaches the supporting rubber member sticking position, to elastically deform the supporting rubber member and cause the supporting rubber member to return to its original position.

The supporting rubber member may have a first hole through which the first supporting member passes; and a second hole which has the axis extending in parallel to the axis of the first hole, and through which the second supporting member passes. The reaching-prevention member may include a parallel portion that extends in parallel to the axis of the first hole. When the assembled exhaust pipe structure is in its stationary position, the first hole in the supporting rubber member may be positioned below the second hole in the supporting rubber member in the vertical direction, and the parallel portion may be positioned below the first hole in the vertical direction.

The reaching-prevention member may also be fixed to a number of locations. In some embodiments, it may be preferable to fix the reaching-prevention member to the exhaust pipe or a component connected to the exhaust pipe. Alternatively, the reaching-prevention member may be fixed to the first supporting member. In other embodiments, the reaching-prevention member may be fixed to the vehicle body or a component attached to the vehicle body.

BRIEF DESCRIPTION OF THE DRAWINGS

The foregoing and further objects, features and advantages of the invention will become apparent from the following description of example embodiments with reference to the accompanying drawings, wherein the same or corresponding portions are denoted by the same reference numerals and wherein.

DETAILED DESCRIPTION OF THE EXEMPLARY EMBODIMENTS

Figure 1:
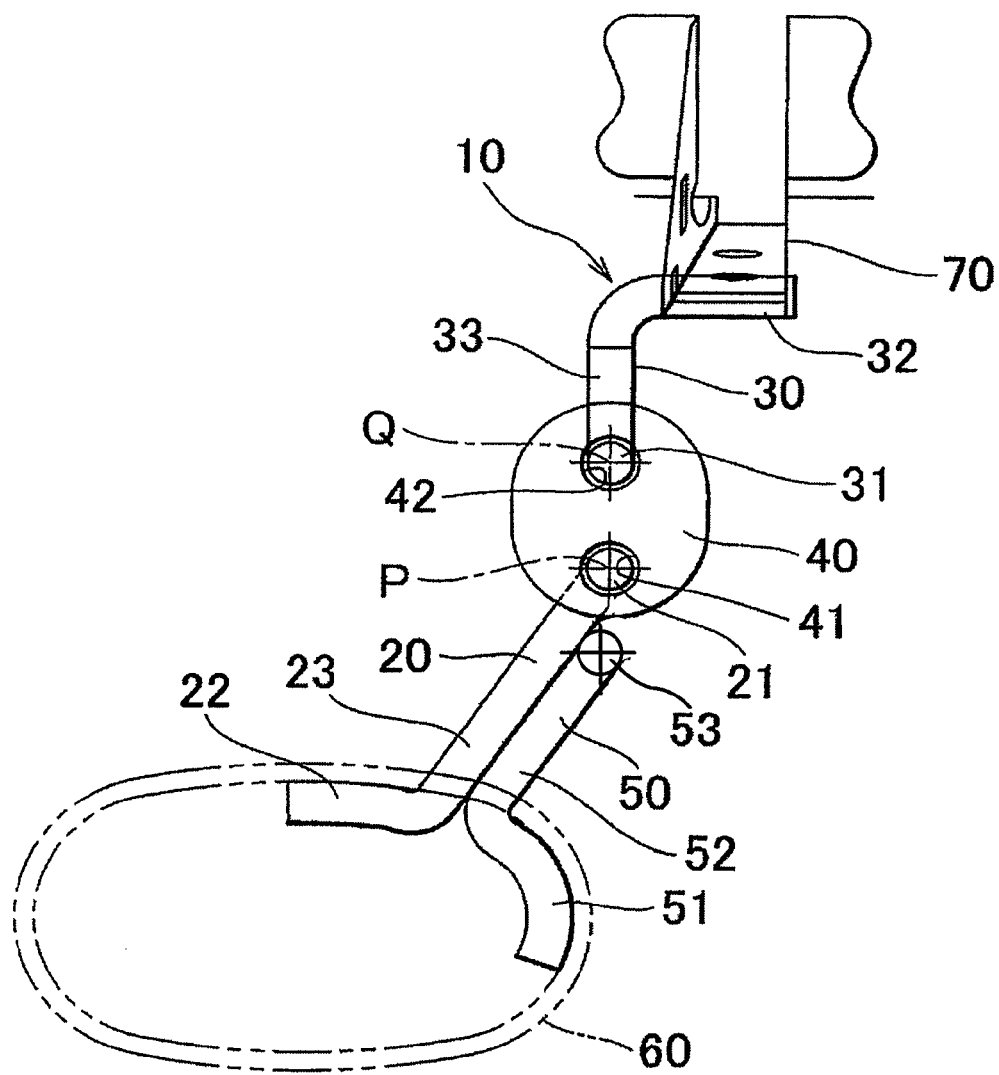
FIG. 1 illustrates a front view of an exhaust pipe structure according to a first embodiment.
Figure 2:
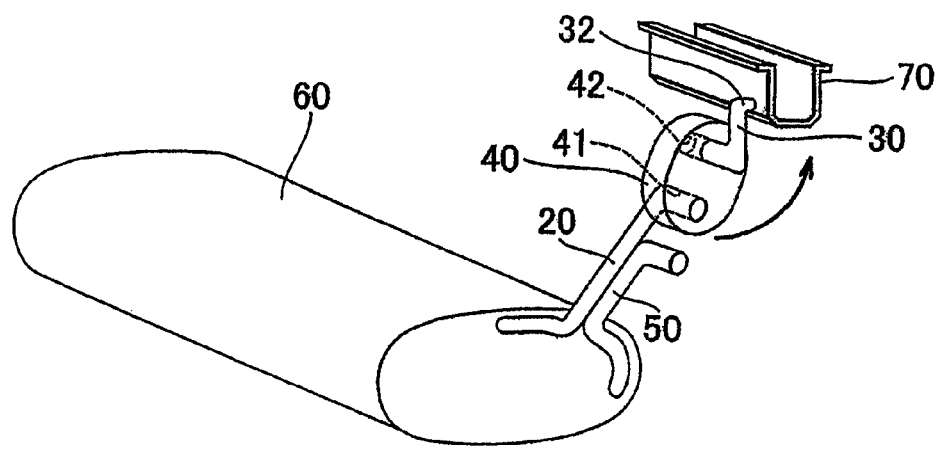
FIG. 2 illustrates a perspective view of the exhaust pipe structure according to the first embodiment.
Figure 3:
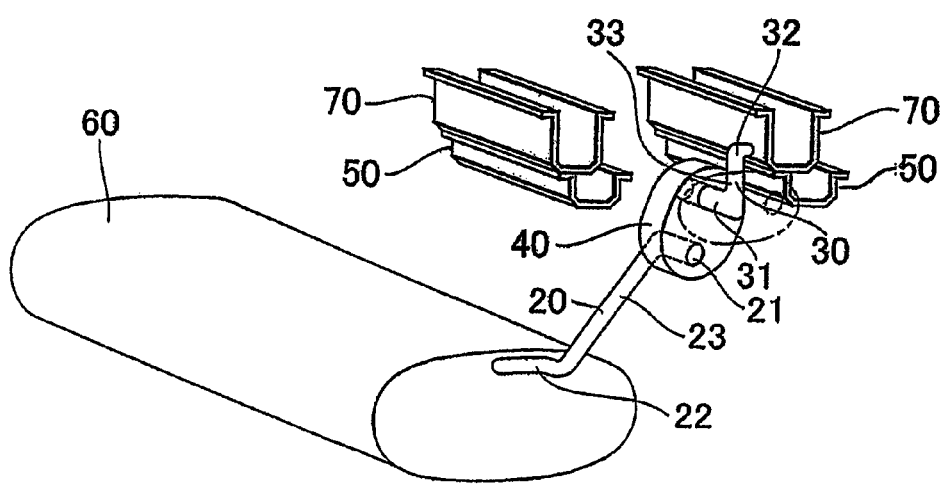
FIG. 3 illustrates a perspective view of an exhaust pipe structure according to a second embodiment.

FIG. 1 and FIG. 2 illustrate an exhaust pipe structure according to a first embodiment of the invention. FIG. 3 illustrates an exhaust pipe structure according to a second embodiment of the invention.

In the following description of the first and the second embodiment of the invention, the same or corresponding portions are denoted by the same reference numerals.

First, the features common to the first embodiment and the second embodiment will be described in detail with reference to FIG. 1 and FIG. 2.

As shown in FIG. 1, in an exhaust pipe structure 10, there are provided a first supporting member 20; a second supporting member 30, a supporting rubber member 40, and a reaching-prevention member 50.

As shown in FIG. 2, the first supporting member 20 is attached to an exhaust pipe or a component connected to the exhaust pipe (hereinafter, the exhaust pipe and the component connected to the exhaust pipe will be collectively referred to as an "exhaust system component 60"). In FIG. 2, the first supporting member 20 is attached to a muffler. The first supporting member 20 may be formed by bending a solid round bar or a hollow round bar. The arrow in FIG. 2 indicates the range of motion of the supporting rubber member.

As shown in FIG. 1, the first supporting member 20 includes a passing-through portion 21 that passes through a first hole 41 (described later in detail) of the supporting rubber member 40; an attached portion 22 that is attached to the exhaust system component 60; and a vertical-direction extending portion 23 that extends in the vertical direction and that connects the passing-through portion 21 to the attached portion 22.

The passing-through portion 21 linearly extends through the first hole 41. The passing-through portion 21 is rotatable in the first hole 41 with respect to the supporting rubber member 40.

The attached portion 22 is fixed to the exhaust system component 60. For example, the attached portion 22 may be welded to the exhaust system component 60.

The upper end portion of the vertical-direction extending portion 23 is contiguous with the passing-through portion 21. The lower end portion of the vertical-direction extending portion 23 is contiguous with the attached portion 22.

The second supporting member 30 is attached to a vehicle body or a component fixed to the vehicle body (hereinafter, the vehicle body and the component fixed to the vehicle body will be collectively referred to as a "vehicle-body-side component 70"). In FIG. 2, the second supporting member 30 is attached to a bracket fixed to a side member (not shown) of the vehicle body.

The second supporting member 30 may be formed by bending a solid round bar or a hollow round bar.

The second supporting member 30 includes a passing-through portion 31 that passes through a second hole 42 (described later in detail) of the supporting rubber member 40; an attached portion 32 that is attached to the vehicle-body-side component 70; and a vertical-direction extending portion 33 that extends in the vertical direction, and that connects the passing-through portion 31 to the attached portion 32.

The passing-through portion 31 linearly extends through the second hole 42. The passing-through portion 31 is rotatable in the second hole 42 with respect to the supporting rubber member 40.

The attached portion 32 is fixed to the vehicle-body-side component 70. For example, the attached portion 32 may be welded to the vehicle-body-side component 70.

The lower end portion of the vertical-direction extending portion 33 is contiguous with the passing-through portion 31. The upper end portion of the vertical-direction extending portion 33 is contiguous with the attached portion 32.

The supporting rubber member 40 connects the first supporting member 20 to the second supporting member 30. The supporting rubber member 40 may be formed in an elliptical shape, and has a predetermined thickness. The supporting rubber member 40 may be symmetric in the right-and-left direction. The supporting rubber member 40 has the first hole 41 through which the passing-through portion 21 of the first supporting member 20 passes; and the second hole 42 which has an axis Q that is parallel to an axis P of the first hole 41, and through which the passing-through portion 31 of the second supporting member 30 passes.

The first hole 41 and the second hole 42 are formed in the center portion of the supporting rubber member 40 in the right-and-left direction. The first hole 41 and the second hole 42 are circular.

The supporting rubber member 40 is rotatably supported by the second supporting member 30. The supporting rubber member 40 rotatably supports the first supporting member 20.

The reaching-prevention member 50 contacts the supporting rubber member 40 just before the supporting rubber member 40 reaches the supporting rubber member sticking position after moving around the axis Q of the second hole 42 from the stationary position of the assembled exhaust pipe structure. In the other words, the reaching-prevention member is arranged so as to be positioned in a space, which will be occupied by the supporting rubber member when the supporting rubber member reaches the supporting rubber member sticking portion. The supporting rubber member 40 moves around the axis Q from the stationary position of the assembled exhaust pipe structure. At the supporting rubber member sticking position, the passing-through portion 21 of the first supporting member 20 is positioned above the passing-through portion 31 of the second supporting portion 30, and the first supporting member 20 and the second supporting member 30 stop moving in this state.

The reaching-prevention member 50 compresses the supporting rubber member 40, when the supporting rubber member 40 reaches the supporting rubber member sticking position, to cause the supporting rubber member 40 to return to its original position.

Next, the following effects common to both the first embodiment and second embodiment will be described in detail.

The reaching-prevention member 50 contacts the supporting rubber member 40 just before the supporting rubber member 40 reaches the supporting rubber member sticking position. Therefore, (a) the reaching-prevention member 50 keeps the supporting rubber member 40 from remaining in the supporting rubber member sticking position, or keeps the supporting rubber member 40 out of the supporting rubber member sticking position. Accordingly, this prevents the exhaust system component 60 from contacting or coming close to the components near the exhaust pipe structure 10. Also, (b) the supporting rubber member 40 can move without being inhibited by the reaching-prevention member 50, until the supporting rubber member 40 reaches or comes close to the supporting rubber member sticking position and contacts the reaching-prevention member 50. Accordingly, the reaching-prevention member 50 need not serve as a "stopper", as used in the manner described in the related art. As a result, the supporting rubber member 40 and the reaching-prevention portion 50 contact each other less frequently than in the related art. Also, (c) the supporting rubber member 40 can move without being inhibited by the reaching-prevention member 50, until the supporting rubber member 40 reaches or comes close to the supporting rubber member sticking position and contacts the reaching-prevention member 50. Accordingly, movement of the exhaust system component 60 is less restricted than in the related art. As a result, noise and vibration in the vehicle compartment can be reduced.

The reaching-prevention member 50 compresses the supporting rubber member 40, when the supporting rubber member 40 reaches the supporting rubber member sticking position, to cause the supporting rubber member 40 to return to its original position. Accordingly, even if the supporting rubber member 40 reaches the supporting rubber member sticking position, the supporting rubber member 40 moves away from the supporting rubber member sticking position because the supporting rubber member 40 returns to its original position.

Because the first hole 41 and the second hole 42 are circular, each of the first supporting member 20 and the second supporting member 30 can be attached to the supporting rubber member 40 in any direction. Accordingly, the first supporting member 20 and the second supporting member 30 can be attached to the supporting rubber member 40 more easily than when each of the first supporting member 20 and the second supporting member 30 is attached to the supporting rubber member 40 only in a certain direction. In addition, because the first hole 41 and the second hole 42 are circular, the direction in which the supporting rubber member 40 ruptures is not limited to a certain direction, unlike the case where the first hole 41 and the second hole 42 are polygonal.

Next, the features peculiar to each of the first embodiment and the second embodiment will be described in detail.

First, the features of the first embodiment will be described. In the first embodiment, the reaching-prevention member 50 may be formed by bending a solid round bar or a hollow round bar. Also, the reaching-prevention member 50 is fixed to the exhaust system component 60 and the first supporting member 20, for example, by welding.

The reaching-prevention member 50 includes a lower end portion 51 that is fixed to the exhaust system component 60; an intermediate portion 52 that extends from the lower end portion 51 that is in parallel to the vertical-direction-extending portion 23 of the first supporting member 20; and a parallel portion 53 that is contiguous with the intermediate portion 52 and that extends in parallel to (or substantially in parallel to) the axis P of the first hole 41. The lower end portion 51 is welded to the exhaust system component 60. The intermediate portion 52 is welded to the vertical-direction extending portion 23 of the first supporting member 20.

The parallel portion 53 contacts the supporting rubber member 40 just before the supporting rubber member 30 reaches the supporting rubber member sticking position.

When the assembled exhaust pipe structure is in its stationary position, the first hole 41 in the supporting rubber member 40 is positioned below the second hole 42 in the supporting rubber member 40 in the vertical direction, and the parallel portion 53 is positioned below the first hole 41 in the vertical direction.

In the first embodiment, the lower end portion 51 of the reaching-prevention member 50 is fixed to the exhaust system component 60. Accordingly, the heat radiation efficiency of the exhaust system component 60 is higher, than when the reaching-prevention member 50 is fixed to a component other than the exhaust system component 60.

Because the intermediate portion 52 of the reaching-prevention member 50 is fixed to the vertical-direction extending portion 23 of the first supporting member 23, the first supporting member 23 is supported has greater support than when the reaching-prevention member 50 is not fixed to the first supporting member 23.

The lower end portion 51 of the reaching-prevention member 50 is fixed to the exhaust system component 60, and the upper end portion 52 of the reaching-prevention member 50 is fixed to the first supporting member 20. Accordingly, the resonance frequency of the first supporting member 20 decreases less than when the reaching-prevention member is fixed to only the first supporting member 20.

The supporting rubber member 40 is symmetric in the right-and-left direction. Also, when the assembled exhaust pipe structure is in its stationary position, the first hole 41 in the supporting rubber member 40 is positioned below the second hole 42 in the supporting rubber member 40 in the vertical direction, and the parallel portion 53 is positioned below the first hole 41 in the vertical direction. Accordingly, the reaching-prevention member 50 can keep the supporting rubber member 40 from remaining in the supporting rubber member sticking position or keep the supporting rubber member 40 out of the supporting rubber member sticking position.

Next, the features of the second embodiment will be described. In the second embodiment, the reaching-prevention member 50 may be attached to the vehicle body side component 70, for example, by welding. Two reaching-prevention members 50 are provided at respective two positions.

In the second embodiment, the reaching-prevention member 50 is fixed to the vehicle body side component 70. The reaching-prevention member 50 keeps the supporting rubber member 40 from remaining in the supporting rubber member sticking position or keeps the supporting rubber member 40 out of the supporting rubber member sticking position.

What is claimed is:

1. An exhaust pipe structure, comprising:
   a first supporting member, attached to an exhaust pipe or a component connected to the exhaust pipe;
   a second supporting member, attached to a vehicle body or a component fixed to the vehicle body;
   a supporting rubber member that connects the first supporting member to the second supporting member;
   the second supporting member has a rotational axis at which the supporting rubber member is connected to the second supporting member; and
   a reaching-prevention member that contacts the supporting rubber member just before the supporting rubber member reaches a supporting rubber member sticking position,
   wherein the supporting rubber member is rotatably supported with respect to the rotational axis of the second supporting member, and the supporting rubber member sticking position is positioned above a position at which a lowest point of the supporting rubber member reaches a same level as the rotational axis of the second supporting member after the supporting rubber member moves around the rotational axis of the second supporting member from a stationary position of the assembled exhaust pipe structure, wherein the lowest point of the supporting rubber member is at a lowest end of the supporting rubber member when the assembled exhaust pipe structure is in said stationary position, and wherein the reaching-prevention member is fixed to the exhaust pipe or a component connected to the exhaust pipe.

2. The exhaust pipe structure according to claim 1, wherein the reaching-prevention member is arranged so as to be positioned in a space, which will be occupied by the supporting rubber member when the supporting rubber member reaches the supporting rubber member sticking position.

3. The exhaust pipe structure according to claim 1, wherein the reaching-prevention member compresses the supporting rubber member, just before the supporting rubber member reaches the supporting rubber member sticking position, to elastically deform the supporting rubber member and cause the supporting rubber member to return to its original position.

4. The exhaust pipe structure according to claim 1, wherein the reaching-prevention member is fixed to the first supporting member.

5. The exhaust pipe structure according to claim 4, wherein the supporting rubber member has a first hole through which the first supporting member passes; and a second hole which has an axis extending parallel to an axis of the first hole, and through which the second supporting member passes; the reaching-prevention member includes a parallel portion that extends parallel to the axis of the first hole; and when the exhaust pipe structure is in its stationary position, the first hole in the supporting rubber member is positioned below the second hole in the supporting rubber member in a vertical direction, and the parallel portion of the reaching-prevention member is positioned below the first hole in the vertical direction.

6. The exhaust pipe structure according to claim 5, wherein the supporting rubber member sticking position is a position which is reached by the supporting rubber member after the supporting rubber member moves around the axis of the first hole from the stationary position of the assembled exhaust pipe structure, and at which the first hole is positioned above the second hole in the supporting rubber member, and the first supporting member and the second supporting member stop moving while the first hole is positioned above the second hole in the supporting rubber member.

7. The exhaust pipe structure according to claim 1, wherein the supporting rubber member is supported by the second supporting member so as to be rotatable around a second connecting portion at which the second supporting member is connected to the supporting rubber member, the second connecting portion being positioned above a first connecting portion at which the first supporting member is connected to the supporting rubber member; and the reaching-prevention member is arranged such that the supporting rubber member contacts the reaching-prevention member just before the supporting rubber member reaches the supporting rubber member sticking position at which the first connecting portion is positioned above the second connecting portion.

8. The exhaust pipe structure according to claim 2, wherein the reaching-prevention member compresses the supporting rubber member, just before the supporting rubber member reaches the supporting rubber member sticking position, to elastically deform the supporting rubber member and cause the supporting rubber member to return to its original position.

9. The exhaust pipe structure according to claim 5, wherein a sum of a distance between the center of the first hole and the lowest point of the supporting rubber member and a distance between the center of the parallel portion and the highest point of the parallel portion is smaller than a distance between the center of the first hole and the center of the parallel portion.

10. The exhaust pipe structure according to claim 1, wherein the component is a muffler.

* * * * *